J. A. TILLNER.
APPARATUS FOR PRODUCING PRESSURE GAS.
APPLICATION FILED JULY 14, 1914.
1,208,407.
Patented Dec. 12, 1916.
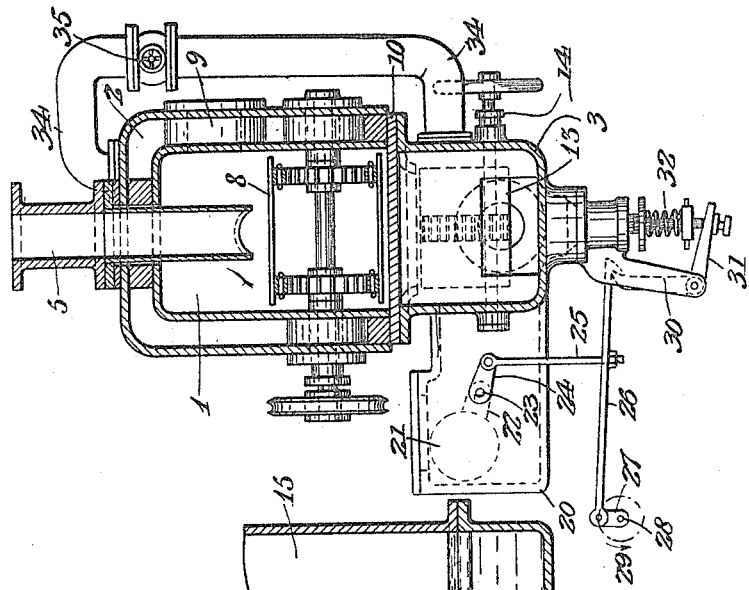
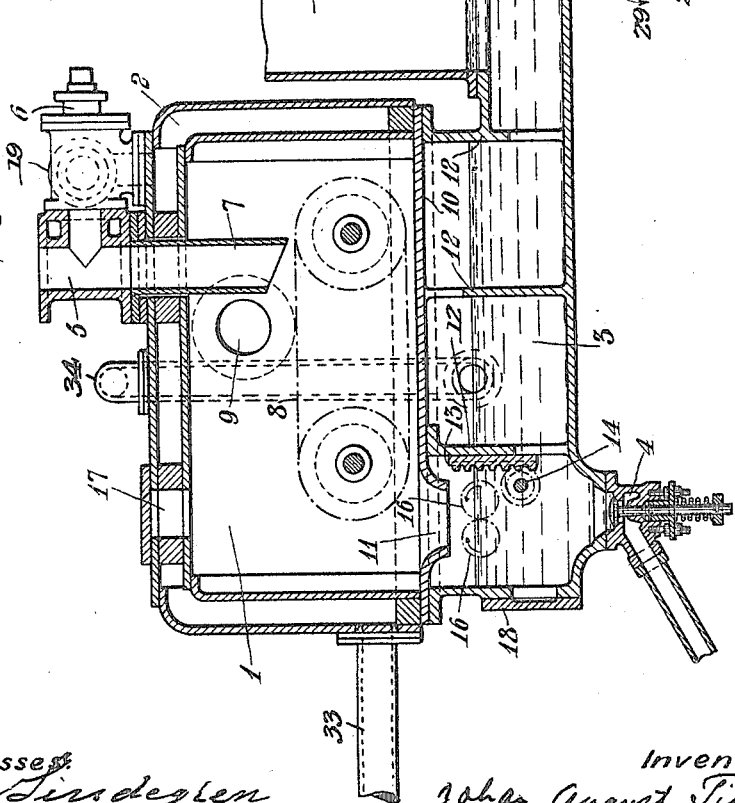
Witnesses:
Inventor:
Johan August Tillner

UNITED STATES PATENT OFFICE.

JOHAN AUGUST TILLNER, OF BORÅS, SWEDEN.

APPARATUS FOR PRODUCING PRESSURE-GAS.

1,208,407.   Specification of Letters Patent.   Patented Dec. 12, 1916.

Application filed July 14, 1914. Serial No. 850,955.

*To all whom it may concern:*

Be it known that I, JOHAN AUGUST TILLNER, a subject of the King of Sweden, residing at Borås, in the Kingdom of Sweden, have invented new and useful Improvements in Apparatus for Producing Pressure-Gas, of which the following is a specification, reference being had to the drawing accompanying and forming a part hereof.

In combustion engines working at a constant pressure, that is, of the type in which the air for the combustion is being compressed to the desired working pressure and combustible matter then added in order that the combustion may take place slowly with increase of the volume but without increase of the pressure, the disadvantage arises that the air is so strongly heated that as the pressure representing a negative work evidently is limited, it is not possible to expand the air to such a degree that the exhaust gases obtain a low temperature on account of which much heat is lost. In order to avoid these disadvantages in combustion engines a special gas producer has been provided in which the combustion of the fuel is allowed to take place, and the engine is then operated with the hot gases produced without explosion or combustion in the cylinder of the engine.

This invention relates to an improved apparatus for producing pressure gases for the said purpose.

The invention is broadly characterized by the fact that the hot gases, generated by combustion of the fuel in a closed room by access of air at the desired working pressure or a pressure somewhat higher, are conducted through one or more water-baths in order to generate steam which is mixed with and superheated by the gases after passing through the water-baths and while they are still carrying heat.

A pressure gas producer embodying my invention is shown by way of example in the accompanying drawing in which—

Figure 1 is a longitudinal vertical section, and Fig. 2 a transverse section of the apparatus.

The apparatus comprises two sections, an upper one 1 preferably made from steel plate and provided with water jackets 2, and a lower one 3 preferably made from cast iron or cast steel, secured to the upper section and provided with a drain valve 4 for the ashes and soot. On the upper section a T-shaped member 5 is fastened to the upper flange of which is fitted an automatic feeder for low-grade, solid, crushed or powdered fuel, such as powdered peat, coal-dust and the like. A three-way cock 6 is connected to the side flange and to a pipe 19 which admits the compressed air. The operation of the apparatus is as follows: From the air compressor which preferably is built in one with the engine the compressed air is admitted into a tank which should be large enough to suffice for the starting of the engine and from this tank through the pipe 19 and the three-way cock 6 into the gas producer. The air and the fuel having become mixed they pass through the pipe 7 down to the grate 8, preferably a chain grate that is moved forward a few millimeters per minute. The fuel on the grate is lighted through the door 9 before starting the engine. One or more peepholes should also be provided at suitable places in order to make it possible to watch the combustion. The lower section of the gas producer is partitioned from the upper section by a plate 10 provided with an opening 11 through which the products of combustion pass. The lower section of the gas producer is kept partly filled with water by means of an ordinary feeding pump, and this lower section is provided with one or more partition plates 12 provided with openings alternately at the top and at the bottom, for the purpose of forcing the gases of combustion through the water-bath one or several times and thus be cleaned and cooled, and also generate steam. The partition plates with an opening at the bottom may suitably be provided with a loose plate 13 adapted to be moved up and down by means of the shaft 14 for the purpose of regulating the depth and thus the intensity of the water-bath. After having passed through the water-bath the gases and the steam enter the tube 15 and pass from there through one or more pipes to the engine or engines. The steam produced is then easily superheated by the remaining heat of the gases of combustion to their temperature. Having reached the end of the chain grate the ashes fall down into the water over the valve 4 and may then be easily blown out without any considerable loss of pressure.

The valve 4 should preferably be automatic, for instance in the following manner: 20 is a covered chamber projecting from the section 3, in which there is a float 21 secured to an arm 22, on the shaft 23 of which there is secured an arm 24 outside the chamber 20. This arm 24 is connected by means of a rod 25 to a reciprocating latch-rod 26 pivoted at one end to a crank 27 on a shaft 28 rotating in the direction of the arrow 29. When the water in the section 3 and in the chamber 20 has risen to a certain height, the float 21 has lowered the rod 25 and the latch-rod 26 to such a position that during its reciprocating movement the latch will catch one arm 30 of a bell-crank lever and pull the same back, thus raising the other arm 31 of the lever so that the valve 4 opens. When the water in the chamber 20 and the float 21 have sunk a certain distance, the latch-rod 26 will be raised out of engagement with the arm 30, so that the valve 4 is allowed to close actuated by its spring 32. In case such fuel is used that forms slag and clinkers a pair of crushing rollers 16 may be placed above the valve. In the upper section of the gas producer is an opening 17 which serves as an outlet for the smoke during the lighting. This opening may preferably be provided with a valve.

When using fresh water for feeding, the water should preferably be fed into the water jacket 2, for instance through the pipe 33, and then flow into the lower section 3 through the pipe 34 provided with the valve 35. If the feeding water is salt water it should be fed directly into the lower section 3 where all generation of steam should take place. When the water is fed directly into the section 3, the jacket 2 may preferably be used for the heating of the compressed air before it is admitted into the producer. For this purpose the air from the tank is admitted into the jacket through the pipe 33 and from the jacket through the three-way cock 6 into the section 1, the pipe 34 being shut off by means of the valve 35. Through this three-way cock 6 the gas producer may thus be in communication with the compressed air tank either directly or through the jacket 2. The gas producer is provided with a suitable number of doors 18 to be used when cleaning the producer.

I claim:

1. In an apparatus for producing pressure gas, the combination of a combustion chamber, an inlet for fuel and air into said combustion chamber, an automatic feeder for fuel in said inlet, a chamber containing water and communicating with the combustion chamber, and means in said water chamber for directing the gases from the combustion chamber through the water in the water chamber, substantially as and for the purpose set forth.

2. In an apparatus for producing pressure gas, the combination of a combustion chamber, an inlet for fuel and air into said combustion chamber, an automatic feeder for fuel in said inlet, a chain grate in said combustion chamber below the said inlet, a chamber containing water and communicating with the combustion chamber, and means in said water chamber for directing the gases from the combustion chamber through the water in the water chamber, substantially as and for the purpose set forth.

3. In an apparatus for producing pressure gas, the combination of a combustion chamber, an inlet for fuel and air into said combustion chamber, an automatic feeder for fuel in said inlet, a chain grate in said combustion chamber below the said inlet, crushing rollers below one end of said grate, a chamber containing water and communicating with the combustion chamber, and means in said water chamber for directing the gases from the combustion chamber through the water in the water chamber, substantially as and for the purpose set forth.

4. In an apparatus for producing pressure gas, the combination of a combustion chamber, an inlet for fuel and air into said combustion chamber, an automatic feeder for fuel in said inlet, a chain grate in said combustion chamber below the said inlet, crushing rollers below one end of said grate, an automatic drain valve below said crushing rollers, a chamber containing water and communicating with the combustion chamber, and means in said water chamber for directing the gases from the combustion chamber through the water in the water chamber, substantially as and for the purpose set forth.

5. In an apparatus for producing pressure gas, the combination of a combustion chamber, an inlet for fuel and air into said combustion chamber, an automatic feeder for fuel in said inlet, a chain grate in said combustion chamber below the said inlet, crushing rollers below one end of said grate, an automatic drain valve below said crushing rollers, a chamber containing water and communicating with the combustion chamber, a number of partition plates in said water chamber dividing the chamber into sections and provided with openings alternately above and below the surface of the water in said chamber, movable plates on the partition plates provided with openings below the water surface, and means for adjusting the position of said movable plates, substantially as and for the purpose set forth.

JOHAN AUGUST TILLNER.

Witnesses:
OSCAR LINDEGREN,
H. G. HAMMAR.